Patented Oct. 27, 1936

2,058,607

UNITED STATES PATENT OFFICE 2,058,607

DERIVATIVES OF THE VIOLANTHRONE SERIES AND PROCESS OF PREPARING THEM

William Hiram Lycan, South Milwaukee, Wis., assignor to E. I. du Pont de Nemours & Company, Wilmington, Del., a corporation of Delaware No Drawing. Application December 29, 1934, Serial No. 759,800

10 Claims. (Cl. 260—61)

This invention relates to derivatives of violanthrones and their preparation. It especially appertains to the substances produced by treating violanthrones having free Bz2,Bz2' positions with an aldehyde (R—CHO), a carboxylic acid halide (R—CO—Halogen), a di-halo-methyl compound (R—HC—Halogen$_2$, R—C—Halogen$_2$—R), a carboxylic acid anhydride

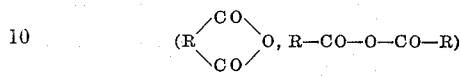

or a sulfonyl halide (R—SO$_2$—Halogen), until one molecular proportion of the treating compounds has been reacted with one molecular proportion of the violanthrone and thereafter treating the mono substituted product with a halogenating substance.

In British Patent #401,645 there is disclosed a process whereby violanthrones not substituted in the Bz2,Bz2' positions may be treated to produce mono substituted derivatives. Specifically in Example II thereof one molecule of violanthrone itself is condensed with one molecule of para-nitro-benzoyl chloride. In like manner in Example V, a reaction between violanthrone and 1-chloro-anthraquinone-2-carbonyl chloride is disclosed and in Example VIII treatment of violanthrone with 1,9-anthrathiazol-2-carbonyl chloride is described.

Mono substituted violanthrones are also obtained by a related process when carboxylic acid anhydrides are utilized. This is disclosed in the same British patent in Example XII. As shown in French Patent 772,824 other mono substituted violanthrones are also obtained by a somewhat similar process when aldehydes are employed. Treatment of violanthrones with sulfonyl halides and di-halo methyl compounds under comparable conditions also produces mono substituted compounds as is shown in Examples I, II, III, IV, V and VI of this application. It has now been found that new organic chemical compounds, new vat dyes, new vat colors, new colored carbon compounds, new intermediates, new vattable compositions of matter and new violanthrone derivatives may be produced by halogenating mono substituted violanthrones of the aforementioned types.

This invention had for an object the preparation of new chemical compounds, new derivatives of violanthrones and new processes for the production of violanthrone derivatives. Other objects were the preparation of a new series of carbon compounds in a very desirable physical form and in a high state of purity. Still further objects were to produce new vat dyes, new halogen containing derivatives of violanthrones and to devise new chemical processes. A general advance in the art and other objects which will appear hereinafter are also contemplated.

The foregoing objects and related ends are accomplished in the manner set out in the following description in which details of what is believed to be the best mode for carrying out the invention are disclosed.

Specifically one method for accomplishing the aforementioned objects, carrying out the new processes, and obtaining the newly discovered products, is by treating with agents yielding a halogen, the mono substituted violanthrones resulting from condensing (or reacting) violanthrones having free Bz2,Bz2' positions with the various reagents enumerated above and their chemical equivalents.

The invention will be further understood by a consideration of the following detailed description and illustrative specific examples in which the quantities are given in parts by weight.

Example I

In a suitable receptacle, there was placed 500–600 parts of antimony trichloride and the same heated to 180° C. To this melt was added 250–300 parts of anhydrous aluminum chloride under agitation. During the addition the temperature dropped to 100°–120° C. It was raised to 150°–155° C. in order to permit the aluminum chloride to digest completely. When a clear solution was obtained the temperature was lowered to 100°–120° C. and 100 parts of finely powdered violanthrone were introduced over a period of one-half to one hour. Complete digestion was permitted to take place. This took place in approximately thirty minutes at 110°–120° C.

When this was accomplished, 40–50 parts of ortho-chloro-benzal chloride were introduced into the melt at 90–100° C. at such a rate as not to allow the temperature to rise over 100°–105° C. When the addition was complete the temperature was cautiously raised to 140°–160° C. for a period of 2–4 hours. The smooth melt was then drowned in a cold solution of hydrochloric acid containing 5–10% HCl, heated to 50°–90° C. and subsequently filtered. The residue was washed with 2–5% hot hydrochloric acid and then with hot water until free of acid. The reaction appears to proceed in such a manner as to allow the chlorine atom on the phenyl nucleus to remain intact. This fact was substantiated by an elementary analysis of the end product. The residual product, which was a dark blue paste assumed, when dry, the physical appearance of a violet powder. Its sulphuric acid solution was reddish-blue to blue.

*Example II*

To a melt of essentially the same proportions of antimony trichloride and aluminum chloride as specified in Example I, there was added 100 parts of violanthrone at 110°–120° C. under good agitation. When complete digestion of the violanthrone had taken place, 67–83 parts of 1-chloro - 2 - omega - di - chloro - methyl - anthraquinone were introduced into the smooth melt.

When this was completed the temperature was raised by heating to 160°–200° C. and maintained within this range for a period of 2–3 hours or until a test sample showed no further evidence of a color change in sulphuric acid. The color change developed in this instance was a brilliant blue differing from the reddish-violet color of violanthrone. The end product was isolated in a manner similar to that described in Example I. Analysis indicated that the alpha-chlor atom remained in its position throughout the reaction.

*Example III*

Six hundred (600) parts of anhydrous antimony tri-chloride are heated to 180° C. and to this molten mass there were added under good agitation 300 parts of anhydrous aluminum chloride. This addition resulted in a decrease in temperature to 100°–120° C. Heat was then applied and the temperature raised to 150°–155° C. where it was held until the melt was completely homogeneous. The melt was allowed to cool to 95°–100° C. and 100 parts of finely pulverized violanthrone were added over a period of 15–60 minutes. When the reaction mass was again homogeneous, and at the same temperature, 35–40 parts of benzene sulfonyl chloride were dropped slowly onto the surface of the melt over a period of 30–60 minutes. After a brief period of agitation, the temperature of the reaction mixture was raised to 140°–180° C. and maintained within these limits for 2–6 hours. At the end of this time, condensation being complete, the entire reaction mass was drowned in cold solution of hydrochloric acid (containing 5–10% HCl). The resulting suspension was brought to a boil and subsequently filtered.

Antimony and aluminum salts were removed from the residual cake by repeated washings with 2–5% hydrochloric acid solution in the hot and the acid was finally removed by washing with hot water. The product thus obtained, when dry, was a dark violet powder, which yielded a blue violet coloration in sulphuric acid. It gave a reddish-blue alkaline sodium hydrosulfite vat.

*Example IV*

A melt composed of 600 parts of anhydrous antimony trichloride and 300 parts of anhydrous aluminum chloride was prepared as described in the preceding example. To this melt at 95°–100° C. there was added 100 parts of violanthrone and subsequently, at a similar temperature, 60–70 parts of anthraquinone-2-sulfonyl chloride were added over a period of 30–60 minutes. After agitating several minutes at this temperature, heat was applied and the reaction temperature raised to 150°–180° C. It was maintained within these limits for 2–6 hours, after which time the condensation was complete.

The reaction mass was then drowned in 5–10% hydrochloric acid solution and the product was obtained in a manner similar to that described in the preceding example. The new composition thus obtained was a dark violet powder, the sulfuric acid solution of which is less reddish-blue than that of the product of the preceding example.

*Example V*

A melt composed of 300 parts of anhydrous antimony trichloride and 150 parts of anhydrous aluminum chloride, was prepared in the manner previously described. To this melt, maintained at 95°–100° C., there was added 50 parts of violanthrone and at a similar temperature 20–25 parts of anthraquinone-2,6-di-sulfonyl chloride were added over a period of 30–60 minutes. After agitating a few minutes, the temperature was raised to 140°–160° C. and held within these limits for 2–6 hours. The resulting condensation product was freed from the reaction mass as described in Example III and there resulted a dark reddish-blue powder. It resembled very closely the product obtained by condensing violanthrone with anthraquinone-2-sulfonyl-chloride.

*Example VI*

To a melt of essentially the same proportions of anhydrous aluminum chlorides as that described in Example V, there was added 100 parts of violanthrone at 95°–100° C. While holding the temperature within these limits 30 parts of methoxy - sulfonyl-chloride (methyl-chloro-sulfonate) was added over a period of 15–45 minutes. After a few minutes agitation at this temperature, heat was applied and the temperature was raised to 140°–160° C. where it was held for 2–6 hours. It was then drowned in dilute hydrochloric acid solution (HCl) and the product isolated exactly as set out in the previous examples. The new compound produced dissolved in sulphuric acid to produce blue solutions.

*Example VII*

One hundred (100) parts of violanthrone were intimately mixed with 35–40 parts of phthalic anhydride and then introduced into 400–600 parts of anhydrous aluminum chloride containing about 20–25% of dry sodium chloride (common salt). The whole was then slowly heated to 180°–200° C., with good stirring. The mass first became fluid and finally changed to a very stiff melt. The heating was continued however until no further hydrogen chloride was evolved. This usually requires from two to four hours. The resultant mass was then taken up with ice water, boiled vigorously, and filtered. The residual bluish-violet cake was then boiled out with dilute ammonia solution and again filtered and washed first with hot water and then hot alcohol. Thirty (30) parts of the resultant finely pulverized bluish-violet dry powder (which has a brownish-red sulphuric acid solution and gives red alkaline hydrosulfite vats) were suspended in 300 parts of ortho-di-chloro-benzene. The suspension was agitated and heated to 130–135° C. Thereafter a stream of dry chlorine gas was passed into the same. When test samples indicated that the product dyed cotton a desired shade, the heating was discontinued and the suspension allowed to cool to room temperature. The new dyestuff produced was isolated by dilution with ethyl alcohol and filtration. The new product produced fast to water navy blue shades on cotton when dyed from an alkaline hydrosulfite vat. It differed from the product of Example IX in that it produced dyeings considerably greener and not quite so bright for the same amount of introduced chlorine.

*Example VIII*

To a melt of 400–600 parts of aluminum trichloride in which 100 parts of violanthrone (dibenzanthrone) have been dissolved or incorporated at 90°–100° C., were added 40–50 parts of benzoic anhydride. The temperature was then raised to 160°–180° C. within a period of one-half to one hour and maintained at this level for approximately two to four hours. The melt was then poured into ice or cold water which has been previously acidulated with hydrochloric acid. The suspension thus obtained was heated to 90°–100° C., and the resultant solid isolated by filtration. The residual bluish-violet cake was then boiled out with dilute ammonia solution, again filtered and washed first with hot water and then with ethyl alcohol. Fifty (50) parts of the resultant dry powder were suspended in 500 parts of ortho-di-chloro-benzene. The resultant suspension while being continuously agitated was heated to 135°–140° C. and a stream of dry chlorine gas passed into the same. When test samples indicated that the product dyed cotton the desired shade the heating was stopped and the suspension allowed to cool to room temperature. The product was removed by filtration and the residual cake washed with an additional small amount of ortho-di-chloro-benzene. As much as 35% of the chlorine has been introduced into the molecule in this manner. The product obtained was a vat dyestuff, fast to spotting with water and has otherwise excellent general fastness.

*Example IX*

One hundred (100) parts of violanthrone were intimately mixed with 40–45 parts of para-nitrobenzoyl cloride and 200–300 parts of anhydrous aluminum chloride containing 20% salt (NaCl). The whole was then heated to 160°–180° C. for a period of 4 to 8 hours or until no further hydrogen chloride was liberated. When the reaction was completed the whole mass was poured into ice water and the suspension boiled for about ½ to 1 hour. The resultant solid was then filtered off and subsequently extracted with hot dilute alkaline solution followed by extraction with hot ethyl alcohol. The product contained nitrogen in the form of a nitro group. Fifty (50) parts of this finely pulverized condensation product were suspended in 500 parts of ortho-di-chloro-benzene. The suspension was agitated and heated to 135°–145° C. and a stream of dry chlorine gas passed into the same. When test samples indicated that the product gave the desired shade on cotton, heating was discontinued and the suspension allowed to cool to room temperature. The solid obtained was a dyestuff which was removed by filtration and the residual cake obtained was washed with an additional small amount of ortho-di-chloro-benzene. As much as 35% chlorine has been introduced in this manner. The product obtained when dry was a bronze-blue powder which is insoluble in ortho-di-chloro-benzene but which has considerable solubility in nitrobenzene. It produced red-violet colorations in sulphuric acid. It was readily soluble to a greenish-blue alkaline (sodium hydroxide) hydrosulfite vat from which cotton was dyed in greenish-blue shades which oxidized in air to greenish to reddish-blue according to the chlorine content of the dye. The dyeings were fast to spotting with water and had otherwise excellent general fastness.

*Example X*

One hundred (100) parts of violanthrone were introduced into 300–400 parts of tri-chloro-benzene. To this suspension there was first added 40–45 parts of para-nitro-benzoyl chloride and then 200–250 parts of anhydrous aluminum chloride. The whole was then heated to 160°–180° C., for about 8–10 hours. The fusion mass was then steam distilled in order to remove the organic solvent. The solid obtained was subsequently isolated and purified as indicated in the preceding example. The product obtained was similar to that obtained in the preceding example. By virture of the nitro groups which it contains it is reducible to an amine. The entire press cake was in this instance reduced to a corresponding amino body by treatment with warm sodium sulfide solution. Specifically, the cake was suspended in 4000 parts of water containing in solution 30 parts of fused sodium sulfide. The resulting suspension was heated for two hours at 95° C., was filtered hot and the residue washed with hot water. The reduction to an amino derivative can also be satisfactorily carried out by means of alkaline sodium hydrosulfite in the manner well known to those skilled in the art as for example by vatting.

Fifty (50) parts of the amino compound resulting from the sodium sulfide reduction were suspended in 500 parts of ortho-di-chloro-benzene and the suspension agitated and heated to 135°–140° C. Dry chlorine gas was passed into the reaction mixture at this temperature until test samples yielded the desired shade upon test dyeing. The introduction of chlorine was then discontinued and the suspension allowed to cool to as low as 50° C. It was then diluted with 1000 parts of ethyl alcohol, the resultant solid product recovered by filtration and thereafter washed with ethyl alcohol.

The product thus obtained was very similar to that of the preceding example. There was a noticeable difference in the behavior of the process of this example and the process of the preceding example in that the rate of absorption of chlorine during the halogenation was more rapid with the amino body.

*Example XI*

One hundred (100) parts of violanthrone were suspended in 300–400 parts of tri-chloro-benzene and to this suspension was added 80–90 parts of para-nitro-benzoyl-chloride (ratio of one mol. of violanthrone to two mols of the latter) followed by an addition of 400–500 parts of anhydrous aluminum chloride. The whole was heated at 160°–180° C. for approximately 15–20 hours. The fusion mass was then steam distilled for the purpose of removing the organic solvent. The violanthrone derivative was then isolated by pouring the mass into ice water and boiling the suspension for from ½ to 1 hour. Thereafter the product was filtered off, extracted with hot dilute alkaline solution and finally purified by extraction with hot ethyl alcohol. Twenty-five (25) parts of the resultant dry powder were suspended in 250 parts of ortho-di-chloro-benzene and 0.1 part of iodine added. Dry chlorine gas was introduced into the resultant suspension under agitation when the same had been heated to 105°–115° C. The halogenation proceeded much more rapidly than was the case in the absence of the iodine. After test samples indicated that the product had reached the desired shade the introduction of chlorine into the reaction mixture was stopped and the same cooled. The desired product was isolated by dilution with alcohol followed by filtration. The product obtained was similar in properties to that of Ex. IX.

*Example XII*

To a fluid melt of 400–600 parts of antimony tri-chloride and 200–300 parts of aluminum chloride was added 100 parts of violanthrone. This was allowed to become thoroughly incorporated in the melt at 100°–120° C. This operation ordinarily takes approximately one-half to one hour. When a homogeneous melt was obtained it was cooled to 80°–90° C., and while maintained at this temperature 40–50 parts of para-nitro-benzoyl chloride was added. The temperature was subsequently raised to 130°–150° C. and maintained at this level for one to two hours. The fluid mass was then poured into warm water which had been previously made acid with sulphuric acid and the product was then isolated by pouring the mass into ice water and boiling the suspension for from ½ to 1 hour. Thereafter the product was filtered off, extracted with hot dilute alkaline solution and finally purified by extraction with hot ethyl alcohol. Twenty-five (25) parts of the condensation product thus obtained were dissolved in 250 parts of 95% sulphuric acid and the resulting solution heated to 70°–80° C. Dry chlorine gas was introduced at this temperature. It was slowly absorbed by the reaction mixture and this absorption was allowed to continue until test dyeings became reddish-blue in shade. The solution was then cooled and drowned in water. The solid product obtained was isolated by filtration and washed free from acid with hot water. It was made directly (without drying) into a dye paste by the addition of a dispersing agent. The new dye produced red shades of blue on cotton which are not fast to spotting with water.

*Example XIII*

Twenty-five (25) parts of the intermediate condensation product produced as described in Example XII were suspended in 250 parts of ortho-di-chloro-benzene after which 30 parts of sulfuryl chloride were added. The resulting mixture was heated gradually to 70°–75° C. where it was held for 4–8 hours. At this time an additional increment of 30 parts of sulfuryl chloride was added and the heating continued for 4–8 hours longer. At the end of this time, the temperature was raised to 120° C. and held in this neighborhood for 30 minutes. The reaction mixture was then cooled and diluted with ethyl alcohol. The desired product was isolated by filtration and the filter cake washed free from solvent with additional amounts of alcohol. The cake when dry was a blue powder somewhat similar to the product described in Example XII. It produced on cotton a red shade of navy blue which changes somewhat upon spotting with water. Its fastness was otherwise excellent.

*Example XIV*

Twenty-five (25) parts of the intermediate condensation product obtained as described in Example IX were suspended in 375 parts of glacial acetic acid. While the suspension was being well agitated 100 parts of bromine were introduced. After this introduction heat was applied and the temperature raised very slowly to that of reflux. Refluxing was continued as long as hydrogen bromide was evolved. Thereafter the reaction mixture was cooled to 60° C., filtered and the residual cake washed first with additional glacial acetic acid and then freed from acid with hot water. There was produced a new vat dye which was a blue powder when dry. It yields a very dense red-violet coloration in sulphuric acid. It was readily soluble to a green-blue alkaline sodium hydrosulfite vat from which cotton was dyed in pure blue shades which turned reddish-blue upon oxidation in air. The dyeings were not fast to spotting with water.

*Example XV*

One hundred (100) parts of violanthrone were suspended in 300–400 parts of tri-chloro-benzene under agitation. To this suspension was added 60–70 parts of 1-chloro-anthraquinone-2-carbonyl chloride followed by an addition of 200–300 parts of anhydrous aluminum chloride at 60°–80° C. The temperature was then raised to 180°–190° C., and maintained at this level for a period of 6–8 hours. The fusion mass was steam distilled in order to remove the tri-chloro-benzene. The residual product was extracted with dilute hydrochloric acid followed by an extraction with dilute alkali and finally with ethyl alcohol. The dry powder of the product thus obtained is a bluish-violet powder having a reddish-brown to reddish-violet sulphuric acid solution. The product contains molecular chlorine. Fifty (50) parts of this finely pulverized product were suspended in 700 parts of nitrobenzene and the resultant suspension heated at 95°–105° C. while introducing dry chlorine gas under good agitation. The chlorine was readily absorbed. When a test sample indicated that the desired shade has been obtained the introduction of chlorine was discontinued and the suspension diluted with 1000 parts of ethyl alcohol. The product was isolated by filtration and the resultant cake washed with nitrobenzene and ethyl alcohol. When dry the new dye was a bluish powder which dissolved readily in sulphuric acid with a red-violet coloration. It dissolved also in alkaline hydrosulfite to yield a bluish-green vat from which cotton was dyed in fast to water navy blue shades. The product differs from that produced in Examples IX and X in that for the same amount of chlorine a greener shade of navy blue is obtained.

*Example XVI*

Six hundred (600) parts of anhydrous antimony trichloride, are heated to 180° C. and to this molten mass there were added under good agitation 300 parts of anhydrous aluminum chloride. This addition resulted in a decrease in temperature to 100°–120° C. Heat was then applied and the temperature raised to 150°–155° C., where it was held until the melt was completely homogeneous. The melt was allowed to cool to 95°–100° C. and 100 parts of finely pulverized violanthrone were added over a period of 15–60 minutes. When the reaction mass was again homogeneous, and at the same temperature, 35–40 parts of benzene sulfonyl chloride were dropped slowly onto the surface of the melt over a period of 30–60 minutes. After a brief period of agitation, the temperature of the reaction mixture was raised to 140°–180° C. and maintained within these limits for 2–6 hours. At the end of this time, condensation being complete, the entire reaction mass was drowned in cold solution of hydrochloric acid (containing 5–10% HCl). The resulting suspension was brought to a boil and subsequently filtered. Antimony and aluminum salts were removed from the residual cake by repeated washings with 2–5% hydrochloric acid solution in the hot and the acid was finally removed by washing with hot water. The product thus obtained, when dry, was a dark violet powder, which yielded a blue violet coloration in sulphuric acid. It gave a reddish-blue hydrosulfite vat.

Twenty (20) parts of this condensation product were suspended in 200 parts of ortho-dichloro-benzene and the suspension heated to 95°–105° C. Dry chlorine gas was passed into the suspension with good agitation at this temperature until test samples indicated that the desired shade has been reached. The suspension was then allowed to cool and diluted with 500 parts of ethyl alcohol. The new dyestuff was isolated by filtration and the residual cake washed free from ortho-di-chloro-benzene with additional portions of ethyl alcohol. When dry the product was a bluish powder which dissolved in sulphuric acid with a violet coloration. Samples containing a chlorine content equal to that of the samples of Example IX yielded dyeings very much greener in shade. The dyeings were very fast to water and had otherwise very excellent general fastness.

Example XVII

A melt was prepared from 300 parts of anhydrous antimony tri-chloride and 150 parts of anhydrous aluminum chloride and in it there was condensed 50 parts of violanthrone and 300 parts of anthraquinone-2-sulfonyl chloride in the manner described in Example XVI. When the condensation was complete the melt was cooled to 105°–110° C. and a stream of dry chlorine gas was passed into the melt. The chlorine was very readily absorbed. When the shade of the product reached that desired, the introduction of chlorine was discontinued and the melt drowned in 3,000 parts of 5–10% hydrogen chloride solution. The resulting suspension was heated to 80°–90° C. and filtered. The residual cake was thereafter washed free from heavy metal salts with dilute hydrochloric acid and washed free from acid with hot water. As a result there was obtained a black cake which was readily converted into a dye paste by the addition of a suitable dispersing agent. The product dyed cotton in green shades of navy blue which were fast to spotting with water. The dyeings were, however, somewhat duller than those obtained in Example IX and Example XV.

Example XVIII

To a melt of essentially the same proportion of antimony trichloride and aluminum chloride, as specified in Example XVII, there were added 100 parts of violanthrone at 110°–120° C. under good agitation. The melt was stirred until it was again homogeneous and there was added 50–60 parts of anthraquinone-2-aldehyde at such a rate that the temperature was maintained at 110°–120° C. When the addition was complete, the temperature was raised to 160°–200° C. and maintained there for a period of 2–3 hours. At the end of this time the melt was drowned in a large volume of cold 5% hydrochloric acid solution. The resulting suspension was brought to the boil and was filtered. The residue was freed from antimony and aluminum salts by repeated washings with hot dilute solutions of hydrochloric acid and the acid was finally removed by washing with hot water. The product thus obtained, when dry, was a violet-blue powder which dissolved to a brilliant blue solution in concentrated sulphuric acid. Thirty (30) parts of this condensation product was suspended in 300 parts of nitrobenzene and the suspension was heated at 100°–110° C. Dry chlorine gas was passed into the suspension with good agitation, at this temperature, until test samples indicated the desired shade had been reached. The suspension was then cooled and was filtered. The residual cake was freed from nitrobenzol by steam distillation. When isolated and dried the product was a blue powder dissolving in sulphuric acid with a blue-violet coloration. It yielded greenish-navy blue dyeings which were fast to spotting with water.

Example XIX

In an exactly similar manner, as set forth in Example XVIII, 100 parts of violanthrone were condensed with 67–83 parts of 1-chloro-2-omega-dichloro-methyl-anthraquinone. The product was isolated in the same manner and was thus obtained, when dry, as a blue powder. It yielded brilliant blue solutions in sulphuric acid. Twenty-five (25) parts of this product were suspended in 250 parts of tri-chloro-benzene and the suspension was heated to 100°–110° C. Dry chlorine was passed in until test samples indicated the presence of about four atoms of chlorine. The suspension was cooled and filtered and the product was isolated by steam distillation of the remaining solvent. It was, when dry, a blue powder yielding blue-violet solutions in sulphuric acid and a greenish-blue vat. It dyed cotton in greenish shades of navy blue and the dyeings were fast to spotting with water.

The invention is not limited to the halogenation of the mono-substituted violanthrones produced by aluminum tri-chloride condensations of violanthrones having free Bz2,Bz2' positions with the specific organic carboxylic acid anhydrides, carboxylic acid halides, sulfonyl halides, aldehydes and omega-di-halides of the above examples, the reaction involving these functional groups being general. As specific of examples of members of these groups advantageously used, the following merit special mention: anthraquinone-2-sulfonyl chloride, anthraquinone-2,6-di-sulfonyl-di-chloride, anthraquinone-2,7-di-sulfonyl-chloride, 1-bromo-anthraquinone-2-carbonyl bromide, 1,9-anthrathiazole-2-carbonyl chloride, 1,9-anthrathiazole-2-carbonyl bromide, 1,9-anthraselenazole-2-carbonyl chloride, 1,9-anthraselenazole-2-carbonyl bromide, 1,9-anthrathiophene-2-carbonyl chloride, 1,9-anthrathiophene-2-carbonyl bromide, 1,9-anthrathiazole-4-carbonyl chloride, 1,9-anthrathiazole-5-carbonyl chloride, 1,9-anthraselenazole-4-carbonyl chloride, 1,9-anthraselenazole-5-carbonyl chloride, 1,9-anthrathiophene-4-carbonyl chloride, 1,9-anthrathiophene-5-carbonyl chloride, meta-nitro-benzoyl chloride, ortho-nitro-benzoyl chloride, 3-chloro-anthraquinone-2-carbonyl chloride, 1-chloro-anthraquinone-4-carbonyl chloride, 1-chloro-anthraquinone-6-carbonyl chloride, 1-chloro-anthraquinone-7-carbonyl chloride, ortho-chloro-benzoyl chloride, benzoyl bromide, chloro-benzoyl bromides, benzoyl chloride, para-brom-benzoyl chloride, alpha-naphthoyl chloride, beta-naphthoyl chloride, anthraquinone-2-carbonyl chloride, anthraquinone-1-carbonyl chloride, 1-nitro-anthraquinone-6-carbonyl chloride, 1-nitro-anthraquinone-2-carbonyl chloride, phthaloyl chloride, succinyl chloride, oxalyl chloride, acetyl chloride, butyric acid chlorides, chloro-benzoic acid anhydride, para-nitro-benzoic acid anhydride, para-brom-benzoic acid anhydride, alpha-naphthoic acid anhydride, beta-naphthoic acid anhydride, anthraquinone-2-carboxylic acid anhydride, para-methyl-benzoic acid anhydride, butyric acid anhydrides, propionic acid anhydrides, metaldehyde, ortho-chloro-benzaldehyde, ortho-chloro-benzal chloride, para-aldehyde, para-formaldehyde, benzaldehyde, para-chloro-benzaldehyde, meta-nitro-benzaldehyde, naphthaldehyde, chloro-naphthaldehyde, nitro-naphthaldehyde, anthraquinone-2-aldehyde, 1-chloro-anthraquinone-2-aldehyde, 1-nitro-anthraquinone - 6 - aldehyde, 1-amino - anthraquinone-2-aldehyde, 1-amino - anthraquinone-6-aldehyde, 1-chloro-2-omega-di-chloro-methyl-anthraquinone, 1 - chloro - 6 - omega - di - chloro-methyl-anthraquinone, 1-amino-2-omega-di-chloro-methyl-anthraquinone, p-nitro-benzoyl-chloride, m-nitro-benzoyl-bromide, p-toluloyl-chloride, 1 -chloro-anthraquinone- 2 -carbonyl chloride, 1-chloro-anthraquinone-2-carbonyl bromide, phthalic-anhydride, benzoic-anhydride, acetic-anhydride, maleic-anhydride, succinic-anhydride, benzene-sulfonyl chloride, p-bromo-benzene sulfonyl chloride, 2-nitro-toluene-4-sulfonyl-chloride, anthraquinone-1-sulfonyl-chloride, 1-nitro-anthraquinone-6-sulfonyl-chloride, anthraquinone-2,6-di-sulfonyl chloride, methoxy-sulfonyl chloride, 1-nitro-anthraquinone-6-sulfonyl bromide, 1 -amino-anthraquinone- 2 -sulfonyl-chloride, naphthalene-sulfonyl chloride, chloro-naphthalene-sulfonyl chloride, nitro-naphthalene-sulfonyl chloride, ortho-chloro-benzene-sulfonyl chloride, meta-nitro-benzene-sulfonyl chloride, butane-1-sulfonyl chloride, methane-sulfonyl chloride.

The temperature at which the halogenation is carried out depends upon the particular body being halogenated, the suspension medium or solvent and the convenience of the person carrying out the halogenation. In general, the temperature for the halogenation does not extend outside the limit 70°–160° C. However, higher or lower temperatures may be employed when the conditions indicate their use. Such specific temperatures and temperature ranges as 50°–60° C., 60°–65° C., 60°–70° C., 80° C., 85° C., 80°–90° C., 90°–100° C., 110°–120° C., 125°–130° C., 135°–140° C., and 140°–150° C., have been found very desirable in certain circumstances. It is not desirable to allow the temperature to go so low that the reaction mixture will solidify in the case of the suspension media having higher melting points. The results desired may also influence the particular temperature used.

The solvent or suspension agent for the halogenation reaction is selected to suit the particular conditions. In addition to such inert solvents as ortho-di-chloro-benzene and nitrobenzene specifically set out in the above examples, tri-chloro-benzene is eminently suitable. Such other solvents as phthalic anhydride, chlor-sulfonic acid, oleum and phosphoric acid may be used. The selection of a halogenation suspension medium will depend to a large extent upon the person carrying out the reaction and the product to be obtained. When desired the suspension medium is removed from the final product by steam distillation instead of filtration.

Other catalysts than the iodine of Example XI are suitable. Many halogenating agents known to the art may be used within the scope of the invention. In addition to those compounds specifically set out in the examples, mention may be made of such reagents as ferric chloride (anhydrous) and antimony penta-chloride. The physical state of the halogenating agent is relatively unimportant as indicated by the above examples in which both liquid and gaseous halogenating agents were employed.

Compounds having a variety of halogens therein may be produced according to this invention. It is frequently advantageous to partially halogenate by treating with chlorine and thereafter complete the halogenation by treatment with bromine. As will be clear, this order of halogenation may be reversed. While the invention relates broadly to halogenation, it will be appreciated that chlorination and bromination will be employed in most instances because of the advantage in price which they have over fluorine and iodine.

The number of halogen atoms entering the molecule during the halogenation of this invention generally increases with the length of time to which the intermediate product is subjected to treatment with the halogen yielding agent. So far as now appears, the best results are obtained with products which appear to contain from three to five halogen atoms per molecule.

The halogenation of violanthrones having free Bz2,Bz2' positions has previously been attempted as will be clear from a study of U. S. Patents 837,778, 1,728,068, 1,771,802, 1,791,215, 1,831,715, 1,842,694, 1,868,608, 1,882,285, and 1,924,443. Some of the products obtained according to these processes apparently have from time to time been offered to the dyeing trade but they suffer from one or more disadvantages such as lack of general fastness, fastness to spotting with water, poor solubility in the vat, poor printing qualities, cost and the like.

The products produced according to this invention are not only valuable dyes but are also useful intermediates in the preparation of dyes. The new products are suitable for general dyeing purposes and are especially valuable in printing. A wide variety of shades can be obtained and the working properties are very satisfactory.

As many apparently widely different embodiments of this invention may be made without departing from the spirit and scope thereof, it is to be understood that I do not limit myself to the specific embodiments thereof except as defined in the appended claims.

I claim:

1. The process which comprises condensing a member of the group consisting of carbonyl halides, sulfonyl halides, aldehydes, carboxylic acid anhydrides and di-halo-methyl carbon compounds with a violanthrone having the Bz2,Bz2' positions free to produce a mono-substituted violanthrone and thereafter halogenating the product.

2. The product obtainable by condensing a member of the group consisting of carbonyl halides, sulfonyl halides and aldehydes, carboxylic acid anhydrides and di-halo-methyl carbon compounds with a violanthrone having the Bz2,Bz2' positions free to produce a mono-substituted violanthrone and thereafter halogenating the product.

3. In the process of preparing vat dyes the step of treating with a halogen yielding agent, the mono-substituted violanthrone obtainable by condensing a violanthrone having the Bz2,Bz2' positions unoccupied with one molecular proportion of a member of the group consisting of carbonyl halides, sulfonyl halides, aldehydes, carboxylic acid anhydrides and di-halo-methyl carbon compounds, said condensation being carried out in an open vessel in the presence of aluminum chloride.

4. The product obtainable by treating with a halogen-yielding agent the mono-substituted violanthrone obtainable by condensing a violanthrone having the Bz2,Bz2' positions unoccupied with one molecular proportion of a member of the group consisting of carbonyl halides, sulfonyl halides, aldehydes, carboxylic acid anhydrides and di-halo-methyl carbon compounds, said condensation having been carried out in the presence of aluminum chloride in an open vessel.

5. The process which comprises suspending 100 parts of violanthrone in 300–400 parts of tri-chloro-benzene under agitation, adding 60–70 parts of 1-chloro-anthraquinone-2-carbonyl chloride, adding 200–300 parts of anhydrous aluminum chloride at 60°–80° C., raising the temperature to 180°–190° C., maintaining this temperature for 6–8 hours, removing the tri-chloro-benzene, extracting the residual product with dilute hydrochloric acid, extracting with dilute alkali, extracting with ethyl alcohol, suspending 50 parts of the resultant product in 700 parts of nitrobenzene, heating to 95°–105° C., introducing dry chlorine gas under good agitation, continuing the chlorine addition until the desired amount of chlorination has taken place, discontinuing the introduction of chlorine, diluting the suspension with 1000 parts of ethyl alcohol, filtering the resultant and washing the filter cake with nitrobenzene and ethyl alcohol.

6. The product obtainable by suspending 100 parts of violanthrone in 300–400 parts of tri-chloro-benzene under agitation, adding 60–70 parts of 1-chloro-anthraquinone-2-carbonyl chloride, adding 200–300 parts of anhydrous aluminum chloride at 60°–80° C., raising the temperature to 180°–190° C., maintaining this temperature for 6–8 hours, removing the tri-chloro-benzene, extracting the residual product with dilute hydrochloric acid, extracting with dilute alkali, extracting with ethyl alcohol, suspending 50 parts of the resultant product in 700 parts of nitro-benzene, heating to 95°–105° C., introducing dry chlorine gas under good agitation, continuing the chlorine addition until the desired amount of chlorination has taken place, discontinuing the introduction of chlorine, diluting the suspension with 1000 parts of ethyl alcohol, filtering the resultant and washing the filter cake with nitrobenzene and ethyl alcohol.

7. In the process of preparing vat colors the step of treating with a chlorine yielding agent, the mono-substituted violanthrone obtainable by condensing violanthrone with one molecular proportion of para-nitro-benzoyl chloride.

8. In the process of preparing vat colors the step of treating with a chlorine yielding agent, the mono-substituted violanthrone obtainable by condensing violanthrone with one molecular proportion of anthraquinone-2-sulfonyl chloride.

9. The product obtainable by treating with a chlorine yielding agent, the mono-substituted violanthrone obtainable by condensing violanthrone with one molecular proportion of para-nitro-benzoyl chloride, said condensation having been carried out in the presence of aluminum chloride in an open vessel.

10. The product obtainable by treating with a chlorine yielding agent, the mono-substituted violanthrone obtainable by condensing violanthrone with one molecular proportion of anthraquinone-2-sulfonyl chloride, said condensation having been carried out in the presence of aluminum chloride in an open vessel.

WILLIAM HIRAM LYCAN.